US000001946H

(19) United States

(12) Statutory Invention Registration (10) Reg. No.: US H1946 H

Foster et al. (43) Published: Mar. 6, 2001

(54) TERTIARY POLYAMINES AS ADDITIVES TO LITHIUM-ION CELL ELECTROLYTES TO PROVIDE LITHIUM-ION CELL HAVING IMPROVED PROPERTIES

(75) Inventors: Donald L. Foster, Laurel, MD (US); Wishvender K. Behl, Ocean, NJ (US); Jeffery B. Wolfenstine, Silver Spring, MD (US)

(73) Assignee: United States of America, Washington, DC (US)

(21) Appl. No.: 09/345,550

(22) Filed: Jun. 30, 1999

(51) Int. Cl.[7] ..... H01M 4/58; H01M 6/18; H01M 6/16

(52) U.S. Cl. ..... 429/231.8; 429/218.1; 429/321; 429/322; 429/324; 429/326

(58) Field of Search ..... 429/231.8, 218.1, 429/321, 322, 324, 326

(56) References Cited

U.S. PATENT DOCUMENTS

| | | | | |
|---|---|---|---|---|
| 3,764,385 | | 10/1973 | Langer Jr. et al. . | |
| 4,132,837 | | 1/1979 | Soffer | 429/194 |
| 4,377,625 | * | 3/1983 | Parsen et al. | 429/198 |
| 4,670,363 | | 6/1987 | Whitney et al. | 429/196 |
| 4,743,185 | * | 5/1988 | Vu et al. | 419/23 |
| 5,028,500 | | 7/1991 | Fong et al. | 429/194 |
| 5,069,683 | | 12/1991 | Fong et al. | 29/623.1 |
| 5,130,211 | | 7/1992 | Wilkinson et al. | 429/198 |
| 5,789,585 | * | 8/1998 | Lee et al. | 540/450 |

OTHER PUBLICATIONS

Foster et al., "Chelating Agents as Electrolyte Additives for Lithium–Ion Batteries," ARL–TR–1878 (Mar. 1999).

Foster et al., "Tertiary Polyamines as Additives to Lithium–Ion Battery Electrolytes," Abstract No. 153(Oct. 1998).

* cited by examiner

*Primary Examiner*—Charles T. Jordan

*Assistant Examiner*—Aileen J. Baker

(74) *Attorney, Agent, or Firm*—Paul S. Clohan, Jr.

(57) ABSTRACT

A secondary, lithium-ion electrochemical cell having improved properties and a method for providing a secondary, lithium-ion electrochemical cell having the same. Specifically, the invention relates to a method for reducing and/or preventing the exfoliation of the graphitic carbonaceous electrode of a lithium-ion cell, wherein the exfoliation is caused by the intercalation of electrolyte solvent along with lithium ion into the graphitic carbonaceous electrode. This method is accomplished by adding one or more chelating polyamines to the electrolyte solution of the lithium-ion cell. The novel method and the improved lithium-ion cell are claimed herein.

16 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TERTIARY POLYAMINES AS ADDITIVES TO LITHIUM-ION CELL ELECTROLYTES TO PROVIDE LITHIUM-ION CELL HAVING IMPROVED PROPERTIES

GOVERNMENT INTEREST

The invention described herein may be manufactured, used, and/or licensed by or for the U.S. Government.

BACKGROUND OF THE INVENTION

1. Field of the Invention

The present invention relates to a method for providing a secondary (rechargeable), lithium-ion electrochemical cell with graphitic carbonaceous anodes having improved properties. Specifically, the invention relates to a method for reducing and/or preventing the exfoliation of the graphitic carbonaceous electrode of a lithium-ion cell, wherein the exfoliation is caused by the intercalation of electrolyte solvent along with lithium ion into the graphitic carbonaceous electrode. This method is accomplished by adding one or more chelating polyamines to the electrolyte solution of the lithium-ion cell. The novel method and the improved lithium-ion cell are claimed herein.

2. Prior Art

Batteries in the prior art generally contain a metal anode, a cathode and an electrolyte which incorporates ions of the metal employed as the anode. When the battery is discharged, metal ions originating from the anode enter the electrolyte and travel to the cathode to generate electrical energy. Assuming that the reaction between the metal ions and the cathode can be reversed, this can be accomplished by applying electrical energy to the battery cell, therefore providing a recharged cell. This type of cell is referred to in the art as a secondary cell.

Secondary cells have been made using alkali metals as the anode material. It is well known that alkali metals are inherently unstable in water and react violently in the presence of water. Because of this, care must be taken to build these types of batteries without exposure of the cell to any ambient moisture or any other source of water. Moreover, the prior art further recognizes that the use of, for example, lithium metal electrodes creates an adverse effect upon the cycling performance and the safety in the finished secondary cell. Replacing alkali metal anodes with a lithium intercalation host, such as graphitic carbonaceous materials, has been found to alleviate the concerns resulting from the use of the metal anodes. Graphitic carbon provides the flattest discharge profile and operation closest to the lithium potential.

Batteries employing a lithium intercalation host as the anode and a lithium salt electrolyte are, by definition, called "lithium ion batteries." The present invention relates to these types of batteries.

Although the use of graphitic carbonaceous electrodes alleviates the issues relating to the use of alkali metal electrodes in secondary cells, other problems are incurred by their use. The problems incurred with use of graphite electrode batteries results from the cointercalation of lithium ion and electrolyte solvent molecules into the graphite anode upon initial charging of the cell. The cointercalation of lithium ion and electrolyte solvent molecules into the graphite anode causes exfoliation of the graphite electrode, irreversible loss of cell capacity and electrolyte solvent, and an overall reduction in cell performance. The issues associated with the use of graphitic carbonaceous materials as anodes in lithium-ion cells, along with theories associated with these issues, are described in detail in Wilkinson et al., U.S. Pat. No. 5,130,211, the disclosure of which is incorporated herein by reference.

In addition to describing the issues associated with the use of graphitic carbonaceous materials as anodes in lithium-ion cells, Wilkinson et al. provides a means to address these issues. Wilkinson et al. teach that the addition of sequestering agents, such as crown ethers and glymes, as well as cryptands and other macroheterocyclic compounds (column 6, lines 5+), to the electrolyte solution of lithium-ion cells prevents/suppresses exfoliation of the graphite electrodes therein upon the initial intercalation of an alkali metal in the cells. The large crown ethers or tetraglyme molecules, for instance, tightly chelate the lithium ions and prevent the solvent molecules from passing into the graphite layers along with the lithium ions. Unfortunately, crown ethers are very expensive, and in all likelihood too costly for most commercial and military applications.

The prior art further teaches that chelating agents may and have been employed as additives to electrolyte compositions in various battery cells and for various purposes. It is important to note, however, that aside from the teaching of Wilkinson et al., the prior art does not suggest the addition of chelating agents to electrolyte compositions for the purpose of preventing exfoliation of graphite electrodes in lithium ion cells.

Langer et al., U.S. Pat. No. 3,764,385, teach the use of monomeric or polymeric, polyfunctional chelating tertiary amines as chelating agents that could be used as electrolyte additives in an electric battery cell so as to form a complex of an inorganic lithium salt. The chelating agents taught could complex with lithium ion so that lithium salts with lattice energy as high as 210 kilocalories per mole could be dissolved in nonpolar solvents such as toluene to concentrations exceeding 1M. Among the many chelating agents taught are N, N, N', N", N"-pentamethyldiethylenetriamine (PMDT), N, N, N", N', N"', N'"-hexamethyltriethylenetetramine (HMTT) and N, N, N', N'-tetramethylethylenediamine (TMED). The battery cell taught by Langer et al., however, is not a lithium-ion cell (the electrodes may be composed of lithium). Moreover, the reference does not address the exfoliation issue of interest herein. No suggestion is made by this teaching to employ these chelating agents in a lithium-ion cell.

A non-aqueous electrochemical cell wherein the electrolyte is comprised of a salt complexed by a tertiary amine and an aromatic organic solvent is taught by Whitney and Foster, U.S. Pat. No. 4,670,363. Whitney and Foster found that the conductivity of these types of electrolyte solutions could be raised over an order of magnitude with the addition of 10% or more of a polar solvent having a dielectric constant greater than 20, such as propylene carbonate or sulfolane. The addition of the tertiary amines act as conductivity enhancers in organic lithium electrolyte solutions. The battery taught by Whitney and Foster is not a lithium-ion battery.

Use of polyamines as electrolyte additives in electrochemical cells are not well known in the electrochemical community; and their use in lithium-ion batteries, in particular, has not been explored.

Although the use of graphitic carbonaceous electrodes in lithium-ion batteries has been taught in the prior art, and the problem of exfoliation identified, the need still exists to provide a rechargeable lithium-ion battery that solves the exfoliation problem in a simple and cost effective fashion.

The present invention addresses this issue by providing a method and means for preventing the exfoliation of the graphitic carbonaceous anode by adding readily available chelating agents to the electrolyte so as to prevent the cointercalation of the electrolyte solvent into the graphite electrode during the cell discharge.

Moreover, the addition of the chelating agents within the scope of the present invention to the electrolyte of the lithium-ion cell will provide an electrolyte which allows reversible intercalation of lithium ions with less exfoliation of the graphite anode or excessive irreversible capacity loss. In general, the present invention provides a method for improving the overall cell performance of lithium-ion electrochemical cells having graphitic carbonaceous electrodes therein.

SUMMARY OF THE INVENTION

The present invention relates to a method of providing a rechargeable lithium-ion cell having improved properties. The method involves the addition of at least one chelating polyamine to the electrolyte solution present in the lithium-ion cell.

Specifically, it has been discovered that the prevention of exfoliation of the graphitic carbonaceous anode of a rechargeable lithium-ion battery can be accomplished by the addition of at least one chelating polyamine to the electrolyte solutions of lithium-ion cells having an anode composed of graphite and like carbonaceous materials. The addition of at least one polyamine chelating agent to the electrolyte of these cells provides a cell having reversible intercalation of lithium ions with less or no exfoliation of the graphite anode and/or excessive irreversible capacity loss.

The high energy, lithium-ion, rechargeable batteries within the scope of the present invention comprise an anode composed of graphite and like carbonaceous materials, and electrolyte solutions comprising therein a lithium salt, a polar electrolyte solvent and at least one chelating polyamine, wherein the chelating polyamine is present in the electrolyte solution in sufficient amounts to prevent or reduce co-intercalation of the electrolyte solvent into the carbonaceous electrode and allow reversible intercalation of lithium ions. Prevention or reduction of co-intercalation of the electrolyte solvent into the carbonaceous electrode eliminates or reduces the undesirable exfoliation of the carbonaceous electrode.

It is an object of the present invention to provide high energy, lithium-ion, rechargeable batteries having graphitic carbonaceous anodes, wherein exfoliation of the carbonaceous anodes is either eliminated or reduced.

It is a further object of the present invention to provide high energy, lithium-ion rechargeable cells having reduced excessive irreversible capacity loss.

Still a further object of the present invention is to provide a cost-effective means for providing a rechargeable, lithium-ion battery having these desired properties.

The means to achieve these and other objectives of the present invention will be apparent from the following detailed description of the invention, drawings and claims.

DETAILED DESCRIPTION OF THE INVENTION

The invention is applicable to any lithium-ion cell having a graphitic carbonaceous anode and a cathode having a potential versus lithium metal of 3.5 V or less. Specifically, lithium-ion batteries within the scope of the present invention have graphitic carbonaceous anodes and an electrolyte solution that contains a chelating polyamine which allows reversible intercalation of lithium ions with little or no exfoliation of the graphite anode or excessive irreversible capacity loss.

Figure 1:
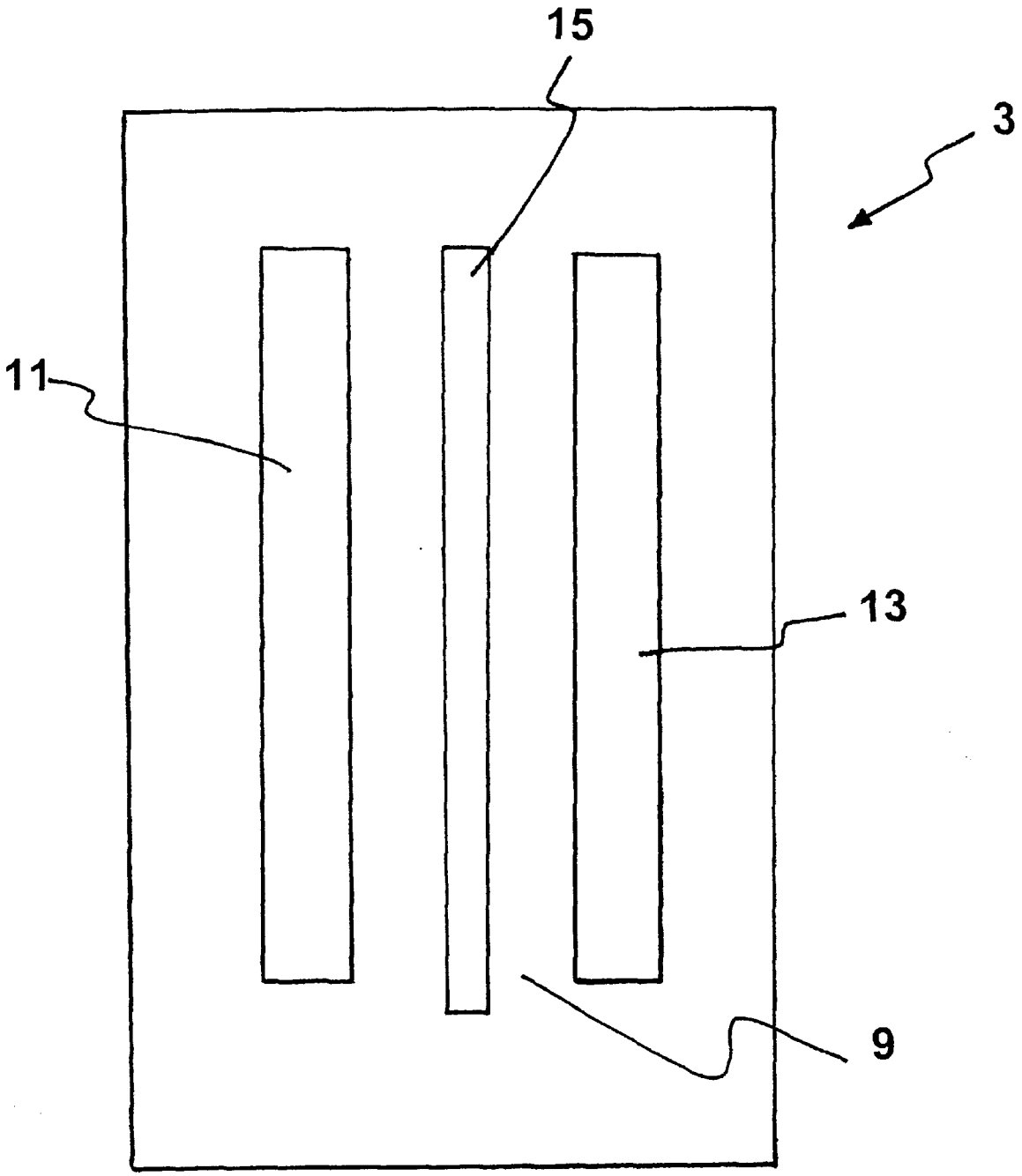
FIG. 1 is a schematic drawing of the electrode assembly of the type that may be employed within the lithium-ion cells of the present invention.

The physical assembly of the lithium-ion battery herein 3, may comprise, for example, a conventional physical electrode assembly such as that set forth in FIG. 1 wherein the anode 11 and cathode 13 have a conventional porous separator 15, such as polypropylene, sandwiched therebetween so as to avoid contact between said anode 11 and said cathode 13. Both electrodes, 11 and 13, are in contact with the electrolyte solution 9. The specific physical assembly of the lithium-ion cell within the scope of the present invention is not critical to the invention. Any conventional physical assembly and method of providing such assembly is well within the skill of the art and can be employed herein.

The novelty of the invention herein resides primarily in the electrolyte solution employed into the lithium-ion battery. Specifically, it has been discovered that the addition of particular chelating polyamines, such as N, N, N', N', N"-pentamethyldiethylenetriamine (PMDT), N, N, N', N", N'", N'"-hexamethyltriethylenetetraamine (HMTT), N, N, N', N'-tetramethylethylenediamine (TMED), and mixtures thereof, to electrolyte solutions of use in lithium-ion cells having anodes composed of graphitic carbonaceous materials provides the desired properties outlined herein. These polyamines are stable at the potential versus lithium of 3.5 V or less, and are very powerful chelating agents that complex with the lithium ions present in the electrolyte into which they are employed. Formation of these complexes is instrumental in causing the reduction of cointercalation of solvent molecules into the graphitic carbonaceous anode in the lithium-ion cell. This helps to retard, reduce or eliminate exfoliation of the anode. Polyamines having similar properties as those identified above may be employed herein as well. The chelating polyamine additives are added to an electrolyte solution in concentrations of at least equal to the lithium ion concentration of the lithium salt employed in the electrolyte.

Electrolyte solutions of the type to which the chelating polyamine within the scope of the present invention may be added comprise (1) a lithium salt of lattice energy less than 210 kilocalories per mole in concentrations ranging from approximately 0.5M to 1.5M, and preferably 1M; and (2) a polar organic electrolyte solvent having a dielectric constant greater than approximately 20. The electrolyte solution may optionally contain 0% wt. to 80% wt. of a non-polar, non-viscous organic solvent, as well.

The lithium salt present in the electrolyte is to be compatible with the cathode and the anode materials in the cell, as well as with the polyamine chelating agent used. Lithium salts which may be present in the electrolyte composition include, for example, lithium chloride, lithium hexafluorophosphate, lithium hexafluoroarsenate, lithium perchlorate, lithium imide, lithium methide, and like lithium salts having a lattice energy of less than 210 kilocalories per mole and mixtures thereof.

Polar organic solvents suitable for use herein are solvents such as ethylene carbonate (EC) and sulfolane, or mixtures thereof. Propylene carbonate (PC), although not an ideal solvent to use due to the destructive effect it has on graphite, may be employed as a polar organic solvent provided it is used in the presence of other polar organic solvents. If PC is employed, a suitable solvent within the scope of the invention, for instance, may comprise a mixture of PC and EC. If this polar solvent is used, the ratio by volume of PC to EC is preferably 1:1. Preferred polar solvent compositions that may be used, however, would not contain PC.

Non-polar, non-viscous organic solvents which may be optionally employed include dioxolane, 1,2-dimethoxyethane, benzene, toluene, 1-methyl pyrrole, or like non-polar organic solvents. These solvents, although optional, can play an important role as well in the electrolyte composition. Some of these solvents, particularly the single ring solvents such as toluene or benzene, cannot be reduced at the lithium potential so that the electrolyte solution will be overall less reactive toward the anode. In addition to decreasing the irreversible capacity loss on the first cycle, the non-polar solvent may also improve the storability and safety characteristics of the lithium-ion cells of the present invention.

The electrolyte solution to which a chelating polyamine additive may be added may comprise, in addition to the lithium salt described, both a polar organic electrolyte solvent and a non-polar, non-viscous organic solvent. The term "electrolyte solvent" used herein refers to the entire solvent composition (whether entirely polar or both polar and non-polar) employed in the electrolyte solution. The electrolyte solvent of the type that may be employed in the electrolyte solution preferably comprises (1) EC mixed with (2) one or more of the following solvents selected from the group consisting of dimethylcarbonate (DMC), ethylmethylcarbonate (EMC), propylenecarbonate (PC), sulfolane, 2-methyl tetrahydrofuran (2-MTHF), diethylcarbonate (DEC), tetrahydrofuran (THF), methylformate, dimethylsulfite, p-dioxane, 1,3-dioxane, dimethoxyethane (DME), and dioxolane and mixtures thereof. The electrolyte solvent may comprise from approximately 30% by volume to 70% by volume EC, wherein the preferred electrolyte solvent comprises 33% by volume EC. The preferred solvents to be mixed with EC to formulate the electrolyte solvent herein are DMC and EMC and mixtures thereof. The amount of DMC and EMC to employ within said electrolyte solvent may vary from approximately 30% by volume to 70% by volume. When a mixture of DMC and EMC are employed in the electrolyte solvent, the preferred composition comprises approximately 33% by volume EC, 33% by volume DMC and 33% by volume EMC. This provides for an electrolyte solvent having the ratio by volume of EC:DMC:EMC of 1:1:1.

The electrolyte solution may be formed by merely mixing the specific component ingredients identified along with the chelating polyamine additive at ambient temperature and pressure in an Argon-filled glove box. It is recommended that moisture and oxygen be maintained at less than 0.5 ppm. The method of combining the specific component ingredients and the polyamine additive of the electrolyte to form the electrolyte solution, however, is not limited to this described method. One having ordinary skill in the art will be able to determine and employ other suitable methods in which to combine these ingredients to form the electrolyte solution within the scope of the present invention.

The electrolyte solution described containing the chelating polyamine additive may be employed in any rechargeable, lithium-ion cell having an anode which allows reversible intercalation of lithium ions. Suitable anodes are, for example, composed of graphite or other carbonaceous materials. The exfoliation of these anodes is prevented and excessive irreversible capacity loss reduced by employing the chelating polyamines identified herein into the electrolyte solutions of the type described.

Conventional cathodes having a potential versus lithium metal of 3.5 V or less may be employed in the improved, rechargeable lithium-ion cells herein. Suitable cathode materials may include, for example, titanium disulfide, $TiS_2$, $MoS_2$, $NbSe_3$, $MoO_3$, $Cr_3O_8$, $V_2O_5$, $V_6O_{13}$ and $TiO_2$. These cathodes may be lithiated in a manner as set forth by Fong et al., U.S. Pat. No. 5,069,683, the disclosure of which is incorporated herein by reference. Fong et al. uses a third electrode composed of lithium sandwiched between the graphite anode and the cathode to facilitate the lithiation of the electrodes. For example purposes only, some air stable lithiated cathode materials that fall within the teachings herein include $Li_{4/3}Ti_{5/3}O_4$ (Ohzuku, A. Ueda and T. Hirai, Chem Express, 7, p. 193 (1992)), $LiCr_{0.4}Mn_{1.6}O_4$ (W. Baochen, X. Yongyao, F. Li and Z Dongyiang, J. Power Sources, 43–44, p. 539 (1993)), and $LiCrMnO_4$ (S Kauo and M. Sato, Solid State Ionics, 79, p. 215 (1995). Cathodes described by Wilkinson et al., U.S. Pat. No. 5,130,211, as well having a potential versus lithium metal of 3.5 V or less would be suitable to be used in the lithium-ion cells of the present invention. The teaching of Wilkinson et al. is also incorporated herein by reference.

Figure 2:
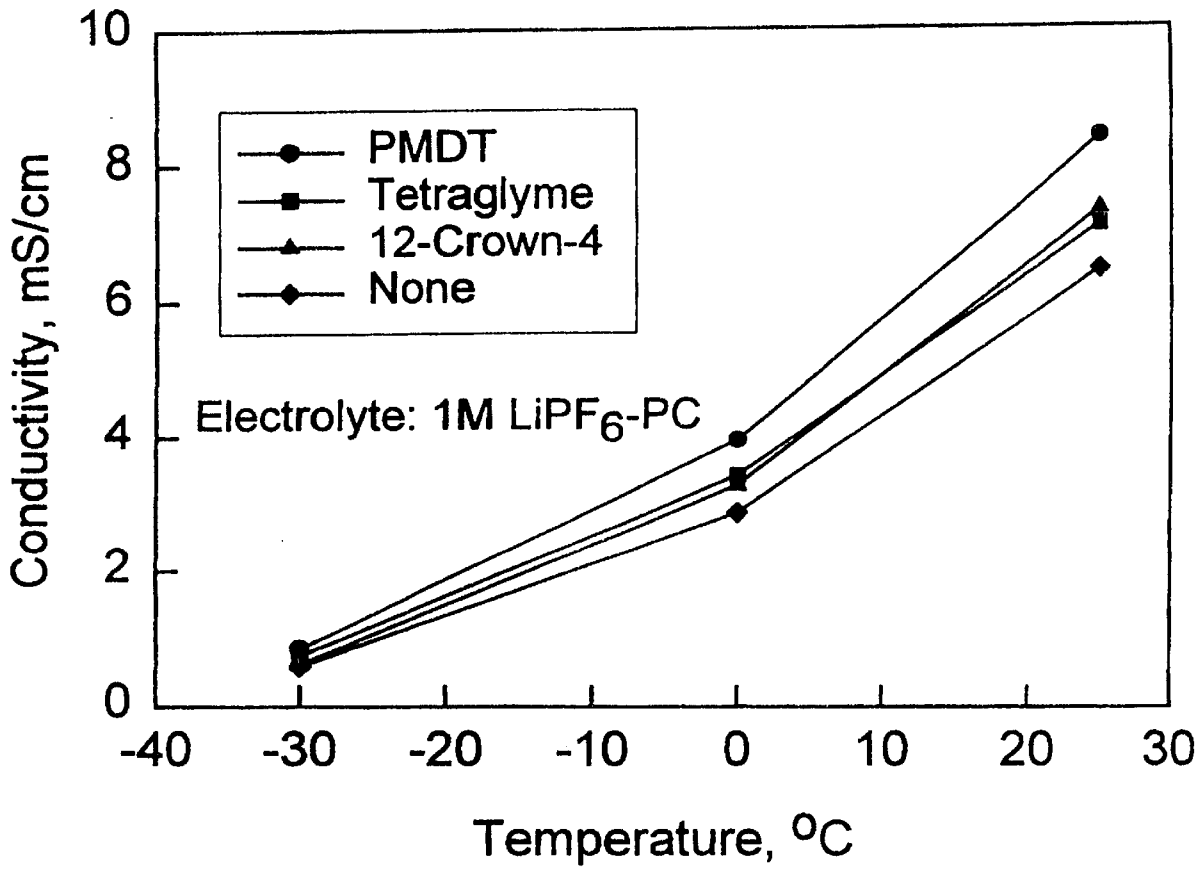
FIG. 2 illustrates the relative effect of PMDT, crown ether and tetraglyme additives on the conductivity of 1M $LiPF_6$/PC electrolytes versus temperature.

It has been determined that the chelating polyamine additives added to the electrolyte solution have a strong affinity for the lithium ion of the lithium salt therein. The strong affinity that, for instance, PMDT has for the lithium ion can be evidenced by the conductivity plot set forth in FIG. 2. FIG. 2 sets forth the effect of PMDT on the conductivity of 1M $LiPF_6$/PC electrolyte versus temperature. The effect of crown ether and tetraglyme additives on the conductivity of the same electrolyte is also plotted. The conductance was measured with two-electrode sealed glass conductivity cells with platinum electrodes at −30° C., 0° C. and 25° C. at a frequency of 1 kHz. The system was permitted to equilibrate for 3 hours at each temperature before measurements were recorded. The cell constant using a standard aqueous potassium chloride solution at 25° C. was determined and the conductivity determined using the calculated cell constant. The figure illustrates that the addition of PMDT to the electrolyte solution provides the largest increase in conductivity of the three additives.

The strong affinity that the chelating polyamines have for the lithium ion prevents the lithium ion from dragging the solvent into the graphite layers of the electrode, which would cause exfoliation. The presence of the chelating agents within the scope of the present invention in the electrolyte solutions described herein serves to sufficiently hinder cointercalation of solvent molecules into the graphite layers of the anode until a passivating solid electrolyte interface (SEI) layer can be formed on the carbonaceous electrode from the reduction of the solvents. The SEI layer forms a protective layer on the carbonaceous electrode that helps prevent/avoid co-intercalation of solvents into the electrode. Once the SEI layer has been formed on the carbon electrode, it has been found that switching to an electrolyte solution that does not contain a chelating polyamine therein would not effect the properties of the cell—exfoliation of the anode continues to be eliminated—because a stable SEI has already been formed during the first cycle.

One skilled in the art will clearly see how the addition of the chelating agents within the present invention to electrolyte solutions in a lithium-ion cell help eliminate or retard exfoliation of the graphitic carbonaceous anode and provide lithium-ion cells having improved properties.

The properties of the invention may be further described by way of example; however, the example set forth below in no way is to be construed as limiting the scope of the invention herein.

Lithium Intercalation and Deintercalation in Graphite Tests

In the experiments conducted, lithium hexafluorophosphate, $LiPF_6$, (Hashimoto, Japan) and SFG-44-graphite (Timcal Ltd.) were used as received from their suppliers. Ethylene carbonate (EC) and propylene carbonate (PC) (both supplied by Grant Chemical Co.), and PMDT (Aldrich Chemical Co.) were dried over 4A molecular sieves and verified by Karl-Fischer coulometric titration to have moisture concentrations of less than 20 ppm before use. The experiments were conducted in a Vacuum Atmospheres Nexus One glove box with the argon atmosphere continuously monitored to be less than 0.5 ppm moisture/oxygen.

Graphite SFG-44 (Timcal Ltd.) electrodes were doctor bladed on electrodeposited copper foil (All Foils, Inc.) substrates using a 5 percent polyvinylidenefluoride (PVDF) binder. The graphite electrodes were vacuum dried at 120° C. for over 24 hours before use.

Lithium intercalation and deintercalation in graphite were tested by cycling graphite flag electrodes versus lithium electrodes in sealed glass cells in the Vacuum Atmospheres Nexus One glove box. The cells were cycled with an Amel model 546 galvanostat/electrometer at a current density of 28 $\mu A/cm^2$ for all lithium cycling experiments. The currents were verified using a Hewlett-Packard model 3435A digital multimeter. The test was performed using 1M $LiPF_6$/EC:PC (1:1 by volume) and 1M $LiPF_6$/1M PMDT/EC:PC (1:1 by volume) as the electrolytes.

Figure 3:
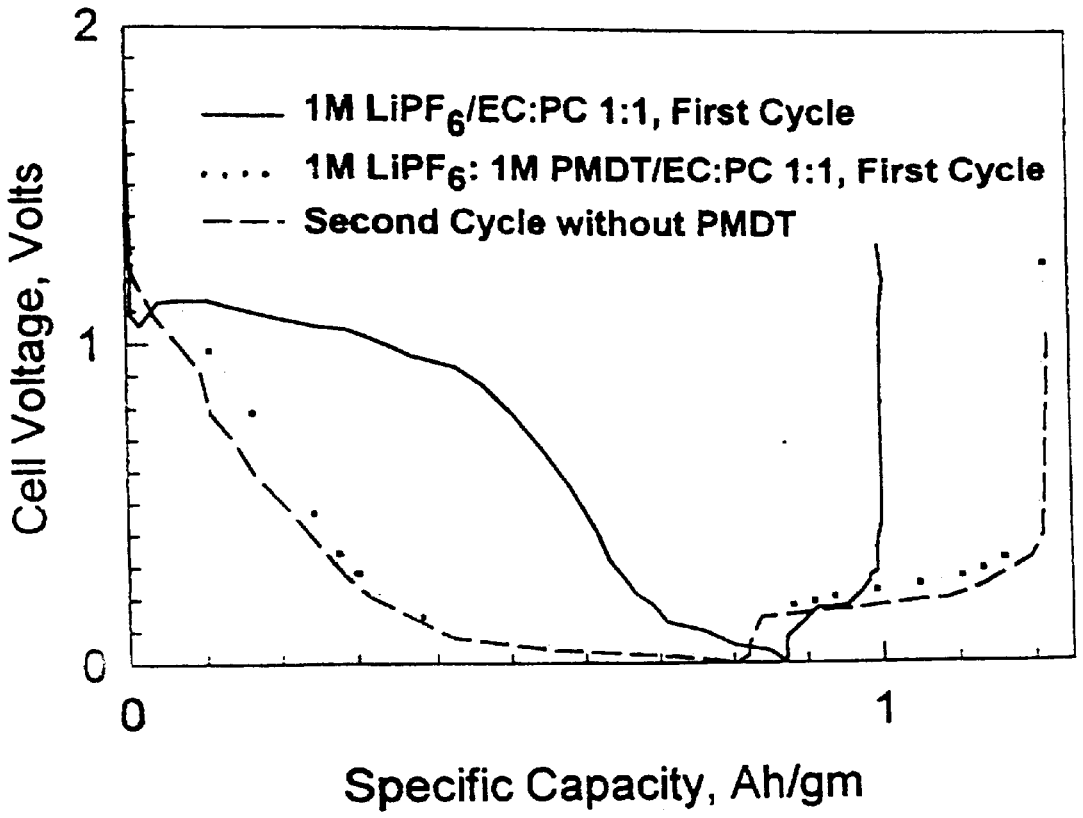
FIG. 3 illustrates the charge-discharge curve for a graphite electrode in (1) 1M $LiPF_6$/EC:PC (1:1 by volume) and (2) 1M $LiPF_6$:1M PMDT/EC:PC (1:1 by volume). Voltage profile of a second cycle of the cell in an electrolyte without PMDT is also illustrated. The representation is set forth as specific capacity (Ah/gm) vs. cell voltage (Volts).

FIG. 3 illustrate the voltage profiles of Li-ion/graphite cells in 1M $LiPF_6$/EC:PC (1:1) both with and without PMDT additive. Specifically, it shows the charge-discharge curve for a fresh graphite electrode in 1M $LiPF_6$/EC:PC (1:1 by volume) and 1M $LiPF_6$/PMDT/EC:PC (1:1 by volume). One will note from the figure that the presence of the PMDT increases the reversible capacity and reduces exfoliation compared to the electrolyte without the PMDT additive. In this first cycle, the voltage profile of the Li/graphite cell in 1M $LiPF_6$/EC:PC (1:1 by volume) is set forth as a solid line in FIG. 3; the voltage profile of the same cell in 1M $LiPF_6$/1M PMDT/EC:PC (1:1 by volume) is set forth as a dotted line. It is interesting to note that the plateaus that are characteristic of staging reactions in graphite are not present in the curve for the graphite electrode in the polyamine-containing electrolyte within the scope of the present invention.

To learn more about the passivating (SEI) films formed on the graphite electrodes in the electrolytes containing the PMDT additive, the graphite electrode, after the first cycle, was moved from an electrolyte containing the PMDT additive to the same electrolyte without the additive. To ensure that no residual additive remained on the electrode being transferred, the electrode was soaked in solvent only (EC:PC) for 24 hours without the presence of the Li-salt or the polyamine chelating additive. The electrode was then subjected to a second cycle in an electrolyte without the PMDT additive present (1M $LiPF_6$/EC:PC (1:1 by volume)).

It was found that the electrode during this second cycle intercalated lithium readily with no exfoliation. Note FIG. 3, wherein the dashed curve represents the second cycle using the electrolyte without PMDT. The performance was similar to that in the first cycle where the electrolyte solution contained PMDT as the additive. Clearly, there is more reversible capacity than can be achieved in electrolyte without the PMDT additive present. This indicates that a stable SEI was formed during the first cycle that prevents further intercalation of solvent molecules into the graphite electrode. On having ordinary skill in the art will recognize the advantages of employing PMDT in the electrolyte composition.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

We claim:

1. A rechargeable, electrochemical cell comprising a graphitic carbonaceous anode;

a cathode capable of reversibly intercalating lithium; and an electrolyte solution comprising at least one polyamine chelating agent and a lithium salt, wherein said at least one polyamine chelating agent is present in said electrolyte in concentrations at least equal to or greater than the concentration of the lithium-ion therein.

2. The rechargeable, electrochemical cell of claim 1, wherein said graphitic carbonaceous anode is composed of graphite.

3. The rechargeable, electrochemical cell of claim 1, wherein said cathode has a potential versus lithium metal of 3.5 V or less.

4. The rechargeable, electrochemical cell of claim 1, wherein said at least one polyamine chelating agent is selected from the group consisting of N, N, N', N", N"-pentamethyldiethylenetriamine, N, N, N', N", N"', N"'-hexamethyltriethylenetetramine and N, N, N', N'-tetramethylethylnediamine, and mixtures thereof.

5. The rechargeable, electrochemical cell of claim 1, wherein said lithium salt is selected from the group consisting of lithium chloride, lithium hexafluorophosphate, lithium hexafluoroarsenate, lithium perchlorate, lithium imide, and lithium methide.

6. The rechargeable, electrochemical cell of claim 1, wherein said lithium salt is present in said electrolyte solution in concentrations ranging from 0.5M to 1.5M.

7. A rechargeable, electrochemical cell comprising a graphitic carbonaceous anode;

a cathode capable of reversibly intercalating lithium; and an electrolyte solution, wherein said electrolyte solution comprises at least one polyamine chelating agent; a lithium salt; and a polar solvent having a dielectric constant greater than about 20, wherein said at least one polyamine chelating agent is present in said electrolyte solution in concentrations at least equal to or greater than the concentration of the lithium-ion therein.

8. The rechargeable, electrochemical cell of claim 7, wherein said graphitic carbonaceous anode is composed of graphite.

9. The rechargeable, electrochemical cell of claim 7, wherein said cathode has a potential versus lithium metal of 3.5 V or less.

10. The rechargeable, electrochemical cell of claim 7, wherein said at least one polyamine chelating agent is selected from the group consisting of N, N, N', N", N"-pentamethyldiethylenetriamine, N, N, N', N", N"', N"'-hexamethyltriethylenetetramine and N, N, N', N'-tetramethylethylenediamine, and mixtures thereof.

11. The rechargeable, electrochemical cell of claim 7, wherein said lithium salt is selected from the group consisting of lithium chloride, lithium hexafluorophosphate, lithium hexafluoroarsenate, lithium pechlorate, lithium imide, and lithium methide.

12. The rechargeable, electrochemical cell of claim 7, wherein said lithium salt is present in said electrolyte solution in concentrations ranging from 0.5M to 1.5M.

13. The rechargeable, electrochemical cell of claim 7, wherein said polar solvent having a dielectric constant greater than about 20 is selected from the group consisting of ethylene carbonate, sulfolane, mixtures of propylene carbonate with ethylene carbonate, and mixtures thereof.

14. The rechargeable, electrochemical cell of claim 7, wherein said electrolyte solution comprises PMDT, lithium hexafluorophosphate, propylene carbonate, and ethylene carbonate, wherein the molar ratio of N, N, N', N"', N"'-pentamethyldiethylenetriamine to lithium hexafluorophosphate is at least 1:1, and wherein the ratio by volume of propylene carbonate to ethylene carbonate is approximately 1:1.

15. The rechargeable, electrochemical cell of claim 7, wherein said electrolyte solution further includes a non-polar organic solvent.

16. The rechargeable, electrochemical cell of claim 15, wherein said non-polar organic solvent is selected from the group consisting of dioxolane, 1,2-dimethoxyethane, benzene, toluene, 1-methyl pyrrole, and mixtures thereof.

* * * * *